United States Patent
Yang et al.

(10) Patent No.: US 9,360,902 B1
(45) Date of Patent: Jun. 7, 2016

(54) LOADING MECHANISM OF STORAGE DEVICE

(71) Applicant: Super Micro Computer Inc., San Jose, CA (US)

(72) Inventors: Che-Ming Jerry Yang, San Jose, CA (US); Lawrence H. Liang, San Jose, CA (US); Richard S. Chen, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 0 days.

(21) Appl. No.: 14/699,098

(22) Filed: Apr. 29, 2015

(30) Foreign Application Priority Data

Jan. 23, 2015 (TW) .............................. 104201112 U (51) Int. Cl.
*G12B 9/00* (2006.01)
*G06F 1/18* (2006.01)
*F16B 2/12* (2006.01)

(52) U.S. Cl.
CPC .. *G06F 1/187* (2013.01); *F16B 2/12* (2013.01)

(58) Field of Classification Search
CPC .................................. G06F 1/187; F16B 2/12
USPC ........... 248/27.1, 310, 313, 316.8; 312/223.1; 361/679.33
See application file for complete search history.

(56) References Cited

U.S. PATENT DOCUMENTS

| 6,381,139 | B1 * | 4/2002 | Sun | G06F 1/184 360/98.01 |
| 8,248,775 | B2 * | 8/2012 | Zhang | G06F 1/187 248/27.1 |
| 8,622,358 | B2 * | 1/2014 | Tang | G06F 1/183 248/274.1 |
| 2008/0013272 | A1 * | 1/2008 | Bailey | G06F 1/187 361/679.33 |
| 2013/0099640 | A1 * | 4/2013 | Hu | G11B 33/124 312/223.2 |

* cited by examiner

*Primary Examiner* — Gwendolyn Baxter
(74) *Attorney, Agent, or Firm* — Chun-Ming Shih; HDLS IPR Services (57) ABSTRACT

A loading mechanism of a storage device for accommodating a hard drive has a loading body and a second supporting arm. The loading body includes a loading base, a first supporting arm extending from one end of the loading base, and an assembling part provided on the loading base. The second supporting arm is laterally and slidably connected to another end of the loading base, and is disposed correspondingly to the first supporting arm. One end of the second supporting arm includes a stand disposed on the loading base and a sliding member disposed on the stand. The sliding member has an elastic engaging part being able to detachably connect to the assembling part. Therefore, the goal of quickly replacing hard disk without using any screws can be achieved.

11 Claims, 11 Drawing Sheets

LOADING MECHANISM OF STORAGE DEVICE

BACKGROUND

1. Technical Field

The current disclosure relates to a loading mechanism of a storage device, particularly to a loading mechanism of a storage device wherein the storage devicecan be replaced rapidly without using screws.

2. Related Art

In accompany with the advancement of technology and great demand of information nowadays, the capacity and quantity of hard drives used in a server have been significantly increased. Hard drives are well known in the art into two types: the traditional hard disk drives (HDD) and the thinner solid state drives (SSD), with several size options: 3.5 inches, 2.5 inches, or 1.8 inches. Normally, the hard drive is pre-installed in a carrier, and then placed in a rack or a cabinet to be fastened into a server.

In general, hard drives are fastened in a server's rack by screws. When maintenance or replacement is required, each of the fastening screws has to be removed and fastened back again after the completion of maintenance. The steps of removal and fastening of the screws are very time consuming, particularly when the operators need to perform such steps again and again upon many hard drives daily. The repetitive removal and fastening steps upon hard drives greatly affect the efficiency of maintenance or support service. It is therefore an important issue of how to improve the efficiency of hard drive assembly and disassembly for maintenance or replacement purpose, particularly for the maintenance of a large amount of hard drives.

In addition, in order to prolong the usage of server's racks, industrial computer cabinets, or telecommunication cabinet, the adaptability of hard drives with various specifications also needs to be considered. A better loading mechanism for different sizes of hard drives will definitely improve the stability and convenience of the whole system during maintenance or replacement support, and minimize the cost and labor during machine shut down.

BRIEF SUMMARY

In one aspect of the present invention, a loading mechanism of storage device of which hard drives can be replaced rapidly without using any screws is provided.

In another aspect of the preferred invention, a loading mechanism of a storage device capable of laterally sliding to accommodate hard drives of different sizes/types is provided.

In one embodiment, a loading mechanism of the storage device for accommodating a hard drive is provided. The loading mechanism of the storage device includes a loading body and a second supporting arm. The loading body includes a loading base, a first supporting arm extending from one end of the loading base, and an assembling part provided on the loading base. The second supporting arm is laterally and slidably connected to another end of the loading base, and is disposed in correspondence to the first supporting arm. One end of the second supporting arm includes a stand disposed on the loading base and a sliding member disposed on the stand. The sliding member includes an elastic engaging part detachably connected to the assembling part.

BRIEF DESCRIPTION OF THE DRAWINGS

These and other features and advantages of the various embodiments disclosed herein will be better understood with respect to the following description and drawings, in which.

DETAILED DESCRIPTION

One embodiment of the present invention provides a loading mechanism of a storage device operatively to rapidly replace and install various sizes of hard drives without using any screw. The hard drive mentioned herein can be of any sizes, such as 3.5 inches, 2.5 inches, or 1.8 inches, or any types, such as hard disk drive (HDD) or solid state drive (SSD) with different thickness, but not limited thereto. In other words, the loading mechanism in the present invention provides corresponding structure to adapt any specific size and type of the hard drive. The detail description and technical content regarding the present invention, along with the diagram, is shown below, but all the diagrams are for illustrating purpose only, which are not used to limit the scope of the present invention.

Figure 1:
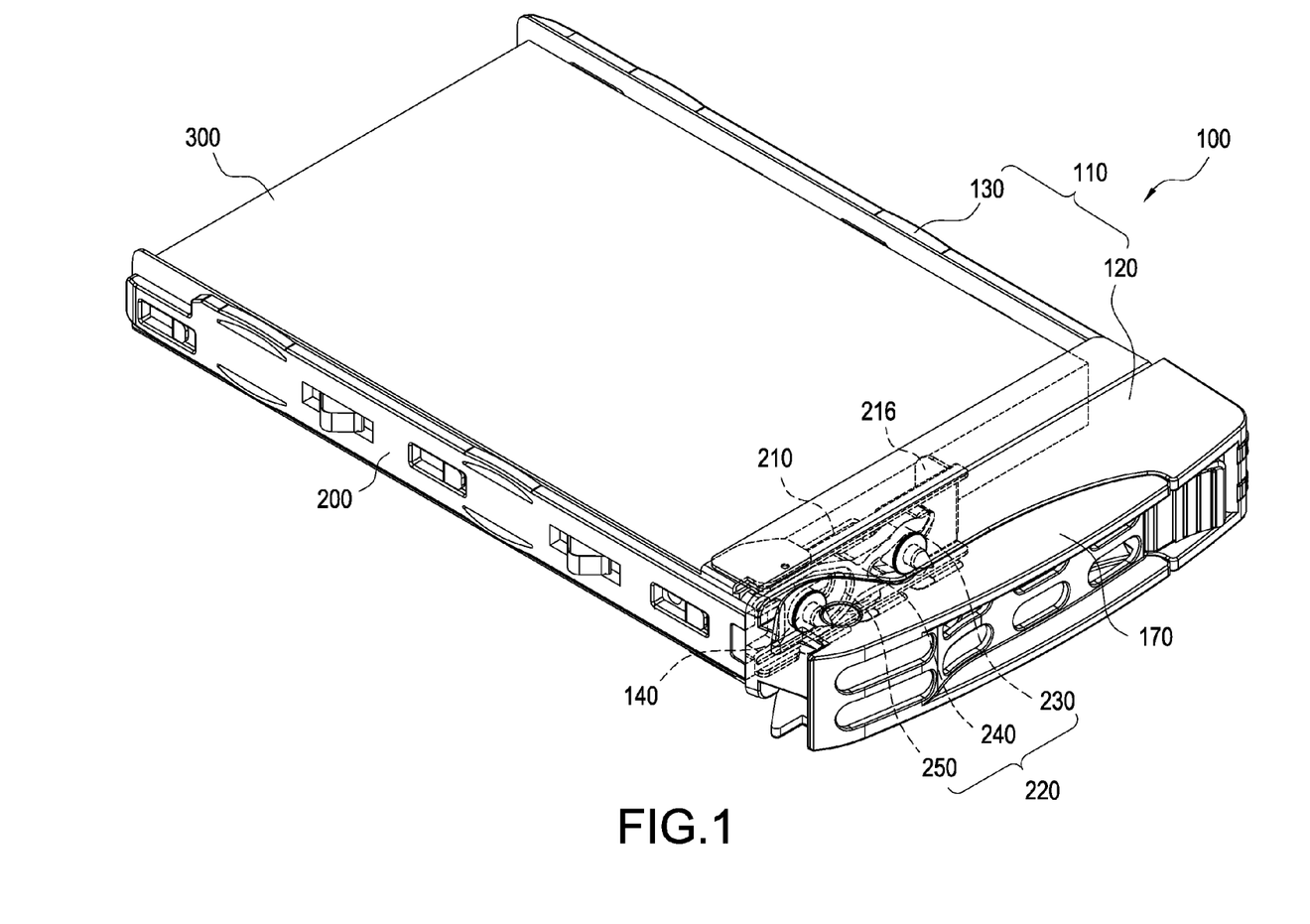
FIG. 1 is a perspective view of an assembling a loading mechanism of a storage device with a hard drive according to one embodiment of the present invention.
Figure 2:
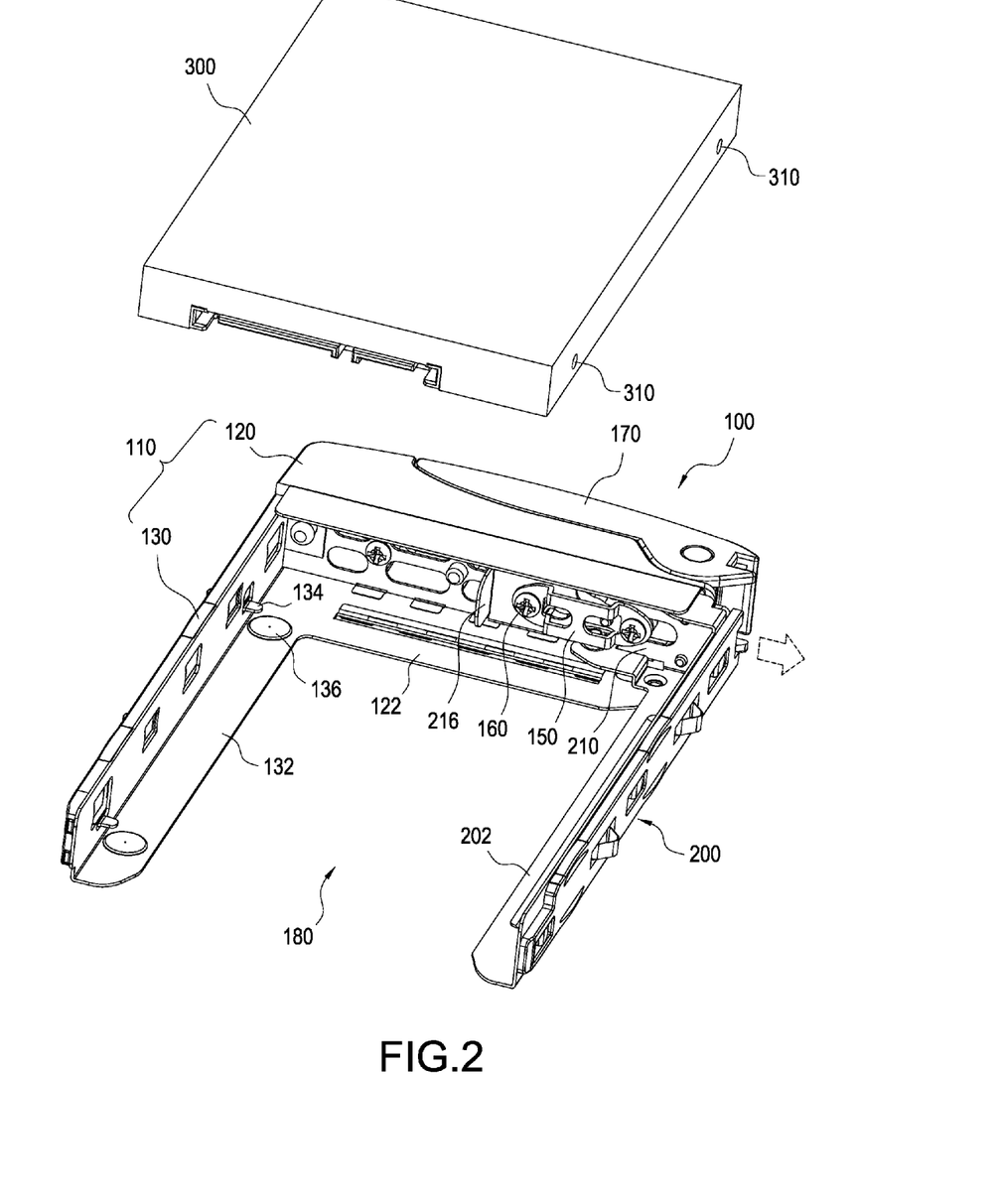
FIG. 2 is an exploded schematic view of a second supporting arm laterally and slidably detached from a loading base according to one embodiment of the present invention.
Figure 3:
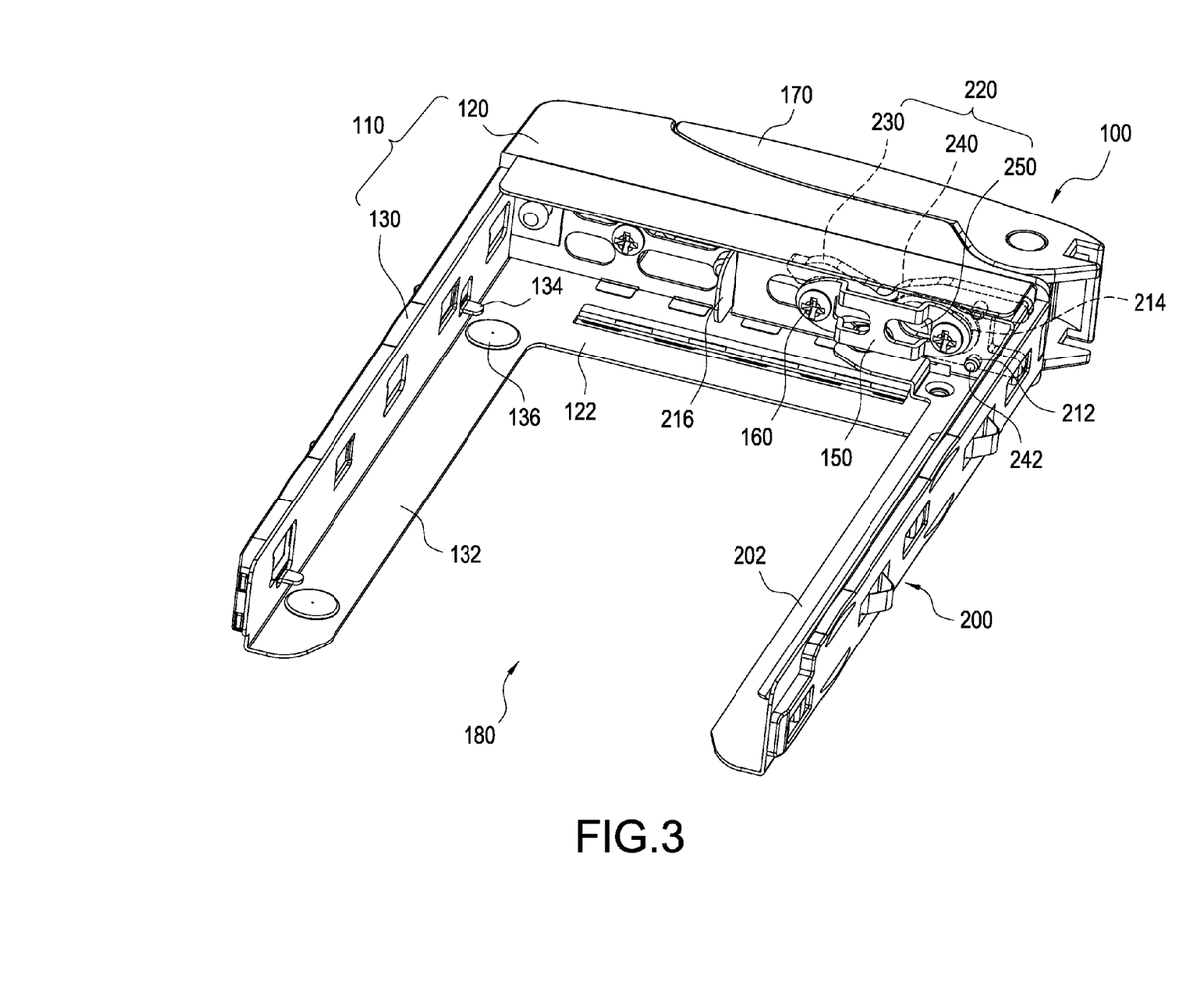
FIG. 3 is a perspective schematic view of the second supporting arm laterally and slidably moving toward the loading base according one embodiment to the present invention.

Referring to FIGS. 1-3, a loading mechanism of a storage device 100 for installing a hard drive 300 is provided. The loading mechanism includes a loading body 110 and a second supporting arm 200. The loading body 110 includes a loading base 120, a first supporting arm 130 extending from one end of the loading base 120, and an assembling part 140 provided on the loading base 120. The second supporting arm 200 is laterally and slidably connected to another end of the loading base 120, and is disposed correspondingly to the first supporting arm 130. One end of the second supporting arm 200 includes a stand 210 vertically connected to the loading base 120 and a sliding member 220 disposed on the stand 210. The sliding member 220 has an elastic engaging part 230 detachably connected to the assembling part 140, such that the stand 210 can laterally slide corresponding to the loading base 120.

As shown in FIGS. 2 and 3, a side edge of the loading base 120, the first supporting arm 130 and the second supporting arm 200 are connected to carrier boards 122, 132, 202, respectively. The carrier board 122 of the loading base 120 and the carrier board 132 of the first supporting arm 130 are connected to each other to form an open slot 180 between the carrier board 122 of the loading base 120 and the carrier board 202 of the second supporting arm 200. The carrier board 122, 132, and 202 are used to support the hard disk 300. Also, the carrier board 202 of the second supporting arm 200 has a height higher than the carrier board 122 of the loading base 120, such that the carrier board 202 can slide on the carrier board 122 of the loading base 120.

Figure 4:
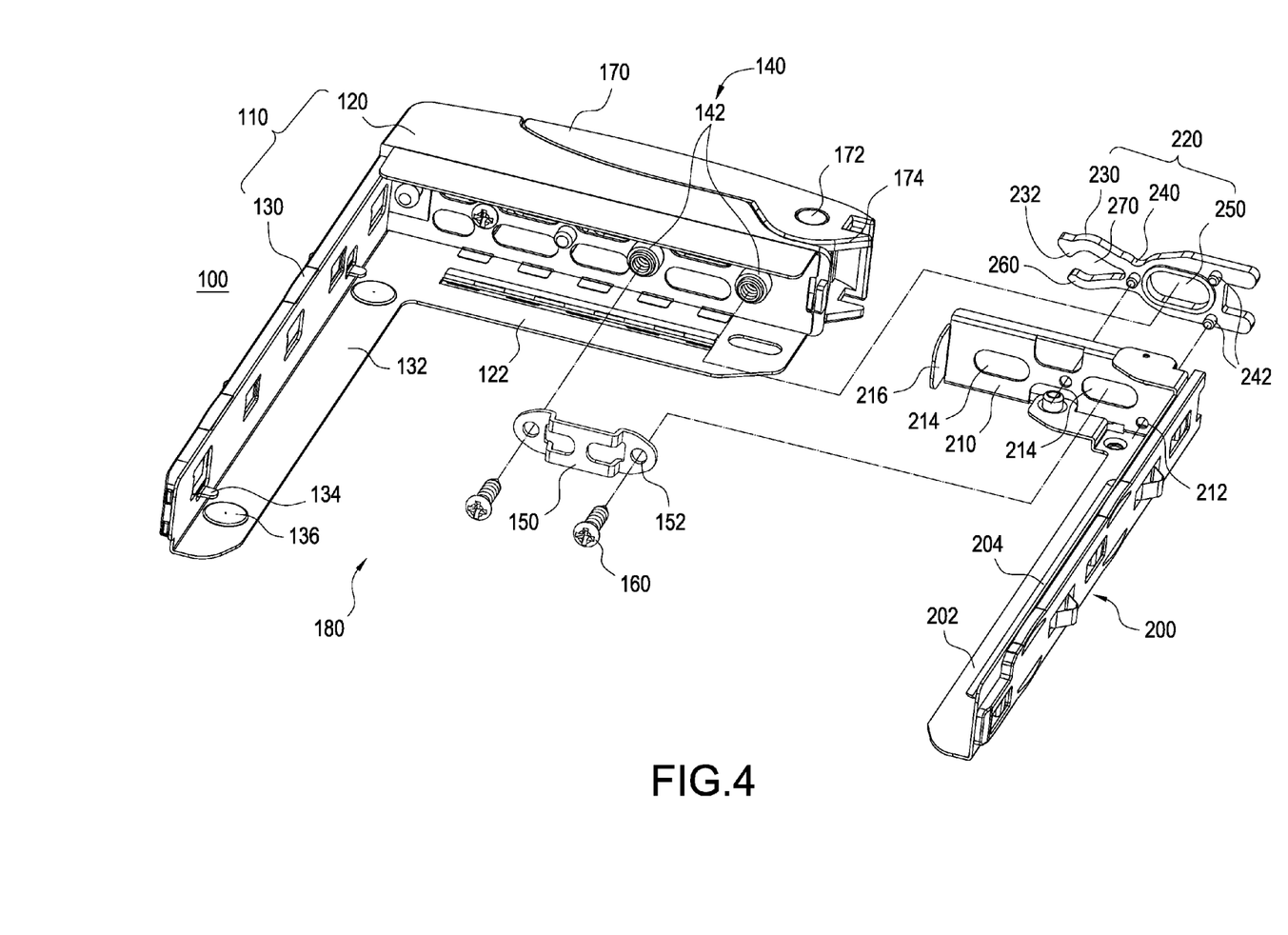
FIG. 4 is an exploded perspective view of the loading mechanism of storage device according one embodiment of the present invention.

Referring to FIG. 4, the sliding member 220 further includes a slider 240, a restricting part 250, and a plurality of positioning posts 242 disposed on a side surface of the slider 240. The restricting part 250 and the elastic engaging part 230 are disposed at two ends of the slider 240, respectively. The stand 210 includes a plurality of positioning holes 212 and a pair of through holes 214. Each of the plurality of positioning posts 242 is accommodated in a corresponding positioning hole 212 to position the sliding member 220 onto the stand 210, and each of the through holes 214 is positioned corresponding to the restricting part 250 and the elastic engaging part 230.

Figure 5:
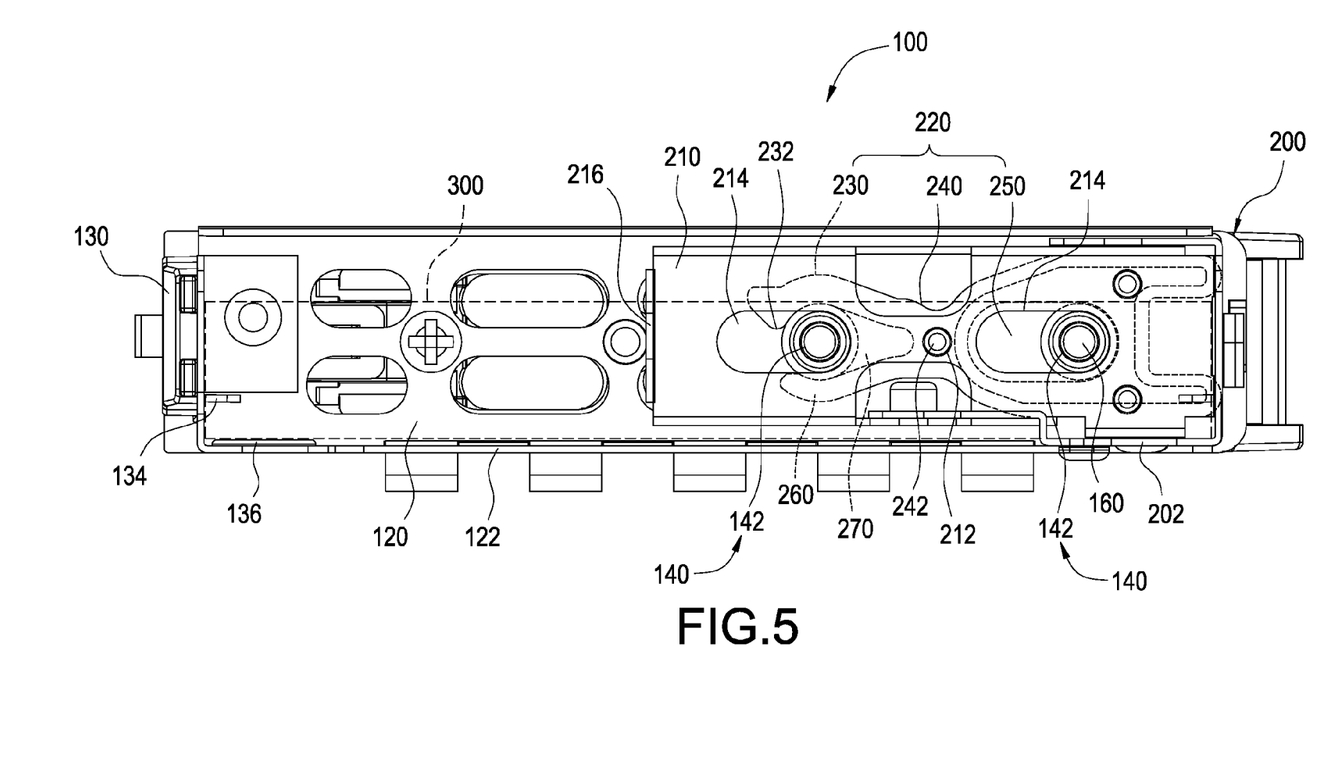
FIG. 5 is an assembling schematic view of an unmoved second supporting arm according to one embodiment of the present invention, which also shows a partially perspective view of the sliding member installed on the loading base.

The assembling part 140 further includes a pair of assembling pillars 142 protruding along an extending direction of the carrier board 122 of the loading base 120. Each of the assembling pillars 142 perforates through the restricting part 250 of the sliding member 220 and each of the through holes 214 of the stand 210, such that the restricting part 250 is able to restrict the displacement of the corresponding elastic engaging part 230. Referring to FIG. 5, the sliding member 220 further includes an elastic hooking part 260 disposed corresponding to the elastic engaging part 230 and a gap 270 provided between the elastic engaging part 230 and the elastic hooking part 260. The corresponding assembling pillar 142 is inserted through the gap 270, such that the elastic engaging part 230 and the elastic hooking part 260 are abutting against a cylindrical surface of the assembling pillar 142.

Figure 6:
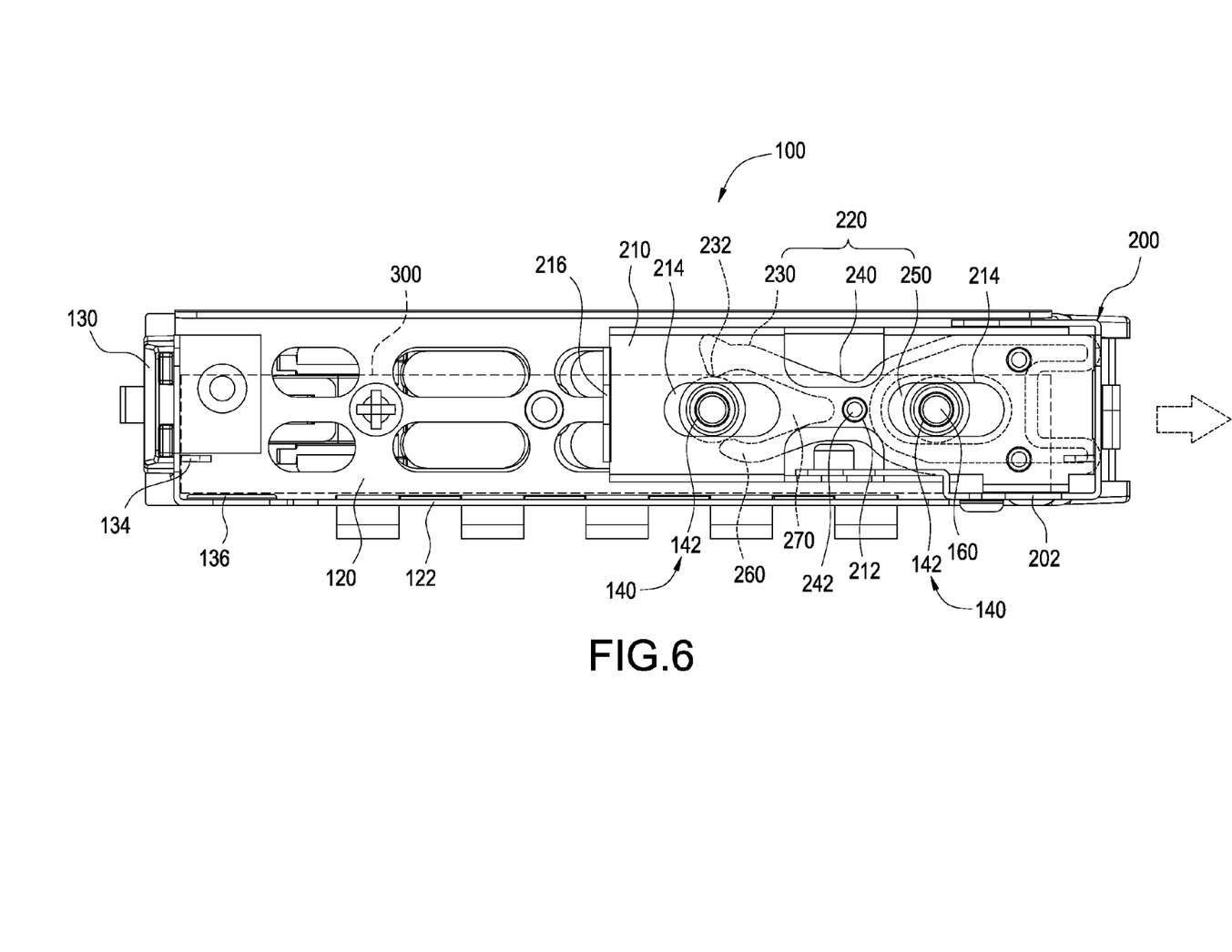
FIG. 6 is a perspective view showing lateral sliding action of the second supporting arm as shown in FIG. 5 according to one embodiment of the present invention.
Figure 7:
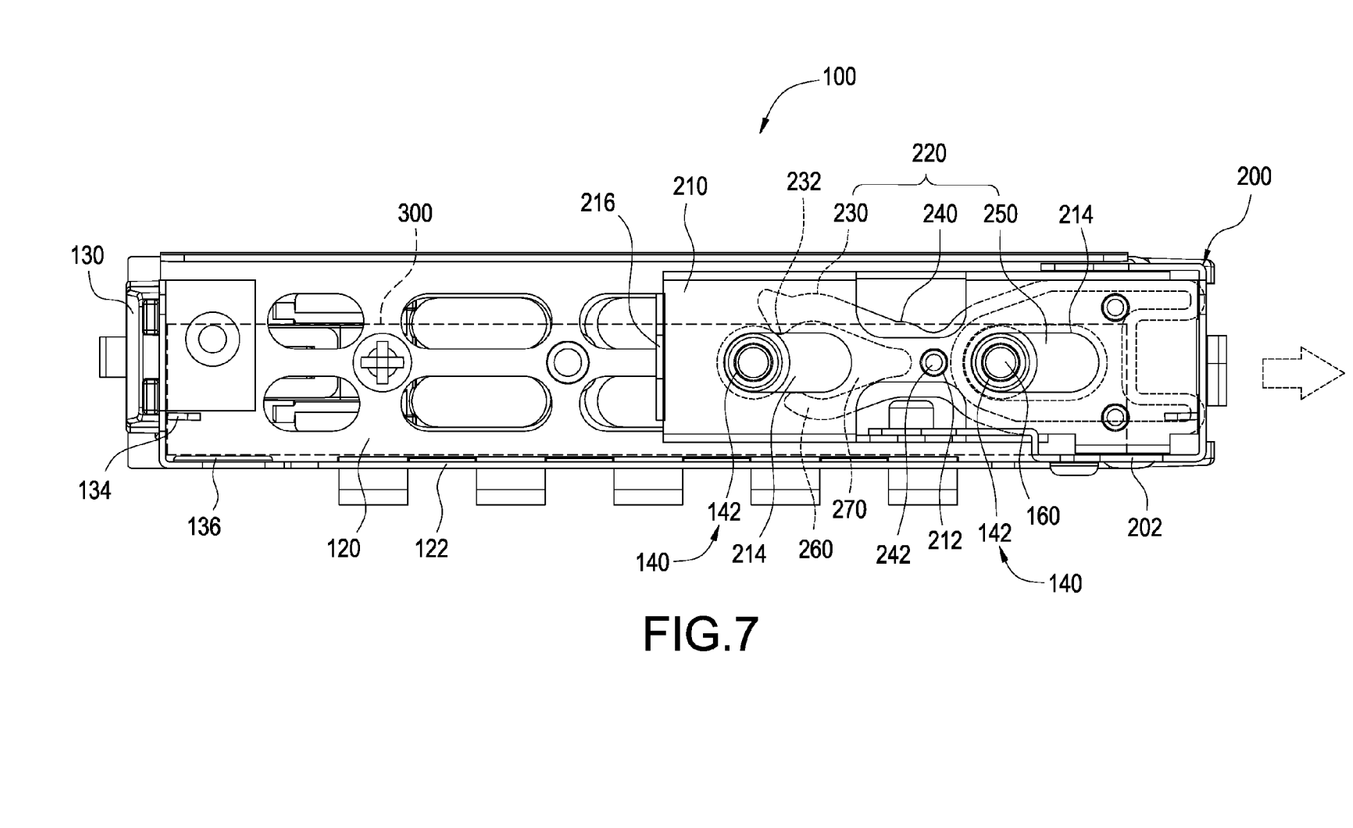
FIG. 7 is a perspective view showing the second supporting arm as shown in FIG. 6 after the sliding movement according to one embodiment of the present invention.

Referring to FIGS. 6 and 7, the elastic engaging part 230 further includes a protruding point 232. The restricting part 250 having an opening corresponding to through hole 214 may be formed with an elliptical shape to allow the assembling pillars 142 to laterally slide in the elliptical shaped openings. The stand 210 further includes a stopper plate 216 vertically protruded away from the sliding member 220. The stopper plate 216 is disposed on top of the carrier board 122 of the loading base 120 to restrict the position where the hard disk 300 is accommodated.

When the user laterally pulls the second supporting arm 200 away from the first supporting arm 130, the elastic engaging part 230 and the elastic hooking part 260 of the sliding member 220 may move across the assembling part 140 (or assembling pillar 142) and arrive at one side of the restricting part 250 as shown in FIG. 7. Meanwhile, the distance between the first supporting arm 130 and the second supporting arm 200 is larger than the width of the hard disk 300 to allow rapid replacement or maintenance the hard disk 300. On the contrary, when the user laterally pushes the second supporting arm 200 toward the first supporting arm 130, the elastic engaging part 230 and the elastic hooking part 260 of the sliding member 220 will be abutting against each and moving across the assembling part 140 (or assembling pillar 142) as shown in FIG. 6. Therefore, the restricting part 250 of the sliding member 220 will move to another side of the corresponding assembling pillar 142; thereby quickly assembling the hard disk 300 to the loading mechanism 100 as shown in FIG. 5.

Referring to FIG. 4, the loading mechanism of a storage device 100 further comprises an assembling plate 150 provided with a pair of assembling holes 152 and a pair of fixing members 160. Each assembling pillar 142 is preferably an element with inner screw thread and is used to fasten with the fixing member 160 (such as screw). Each of the fixing members 160 perforates through each of the assembling holes 152 to each of the assembling pillars 142 of the assembling plate 150, respectively. The assembling plate 150 has an area larger than that of the through holes 214 and presses against the stand 210 towards the loading base 120. By using each fixing member 160 to fix the assembling pillar 142, the relative displacement between the second supporting arm 200 and the loading base 120 can be restricted, and thereby preventing excessive force from causing the second supporting arm 200 (or stand 210) to detach from the loading base 120.

Figure 8:
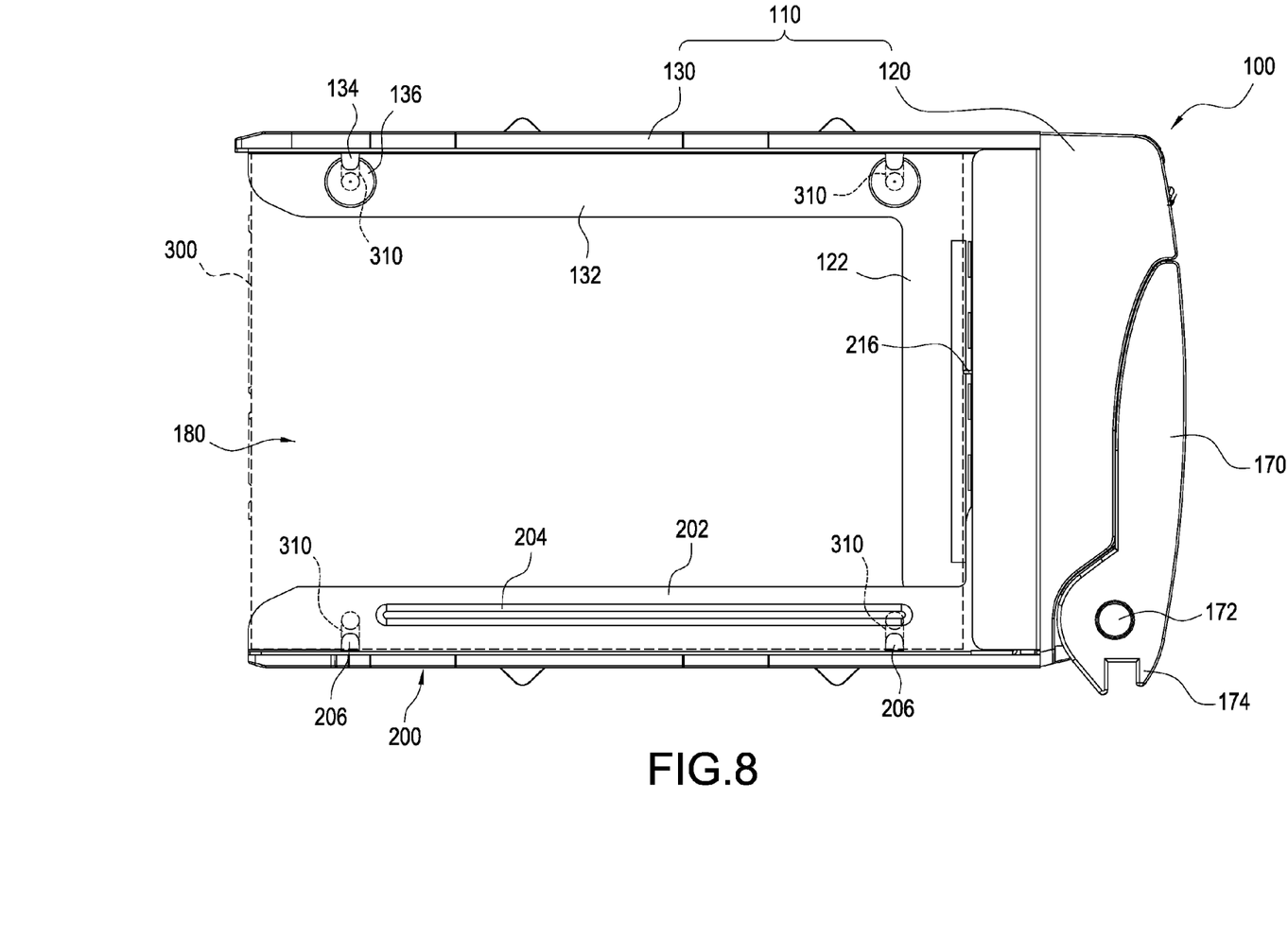
FIG. 8 is a top view of the loaded and assembled hard disk as shown in FIG. 5 according to one embodiment of the present invention.
Figure 9:
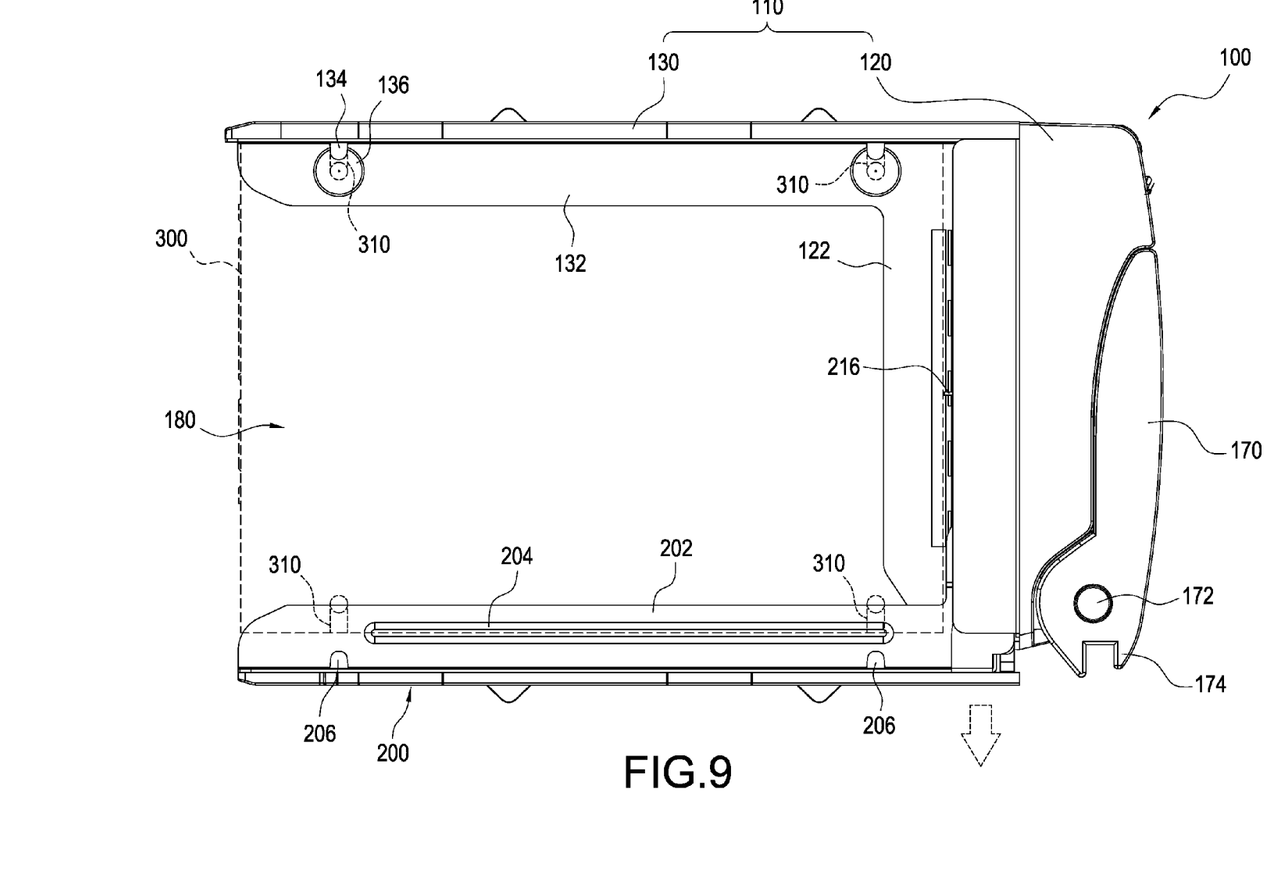
FIG. 9 is a top view of FIG. 7.

Referring to FIGS. 7 and 8, the carrier board 122 and 132 of the loading base 120 and the first supporting arm 130 are connected to each other. The first supporting arm 130 further includes a pair of protruding parts 134 and a pair of pads 136. The amount of the protruding parts 134 and the pads 136 are determined according to the amount of the screw holes 310 of different hard disks 300. For example, the 2.5 inch hard disk includes 4 screw holes on two sides thereof, and the 3.5 inches hard disk includes 6 screw holes on two sides thereof. Each of the protruding parts 134 protrudes toward the second supporting arm 200 in parallel with the carrier board 132. Each of the pads 136 is disposed on the carrier board 132, so as to level the height of the pad 136 with that of the carrier board 202. The second supporting arm 200 further includes a pair of protruding parts 206 corresponding to each of the protruding parts 134 of the first supporting arm 130. The carrier board 202 includes a reinforcing rib 204 parallel to the second supporting arm 200 to strengthen the carrier board 202 and level the height of the carrier board 202 of the second supporting arm 200 with the height of the carrier board 132 and 122 of the first supporting arm 130 and the loading base 120.

In FIGS. 7 and 8, the protruding part 134 of the first supporting arm 130 and the protruding part 206 of the second supporting arm 200 are preferably corresponding to the screw holes 310 of the hard drive 300. Therefore, when the second supporting arm 200 laterally moves relative to the first supporting arm 130, the protruding parts 134 and the stopper plate 216 of the loading mechanism 100 can provide positioning effect at two sides of the hard drive 300, respectively. Therefore, the operators can easily and rapidly install, replace, or detach the hard disks 300 without the need of using any screws or fastening tools.

The loading mechanism of a storage device 100 further comprises a handle 170 equipped with a pivot 172 and a pushing part 174. The pushing part 174 is provided at one end of the handle 170, and the handle 170 is rotatably connected to the loading base 120 with the pivot 172 as rotating axis or axle center. The pushing part 174 can push a tray (not shown) to force the tray to exit from the loading mechanism of a storage device 100 (not shown).

Figure 10:
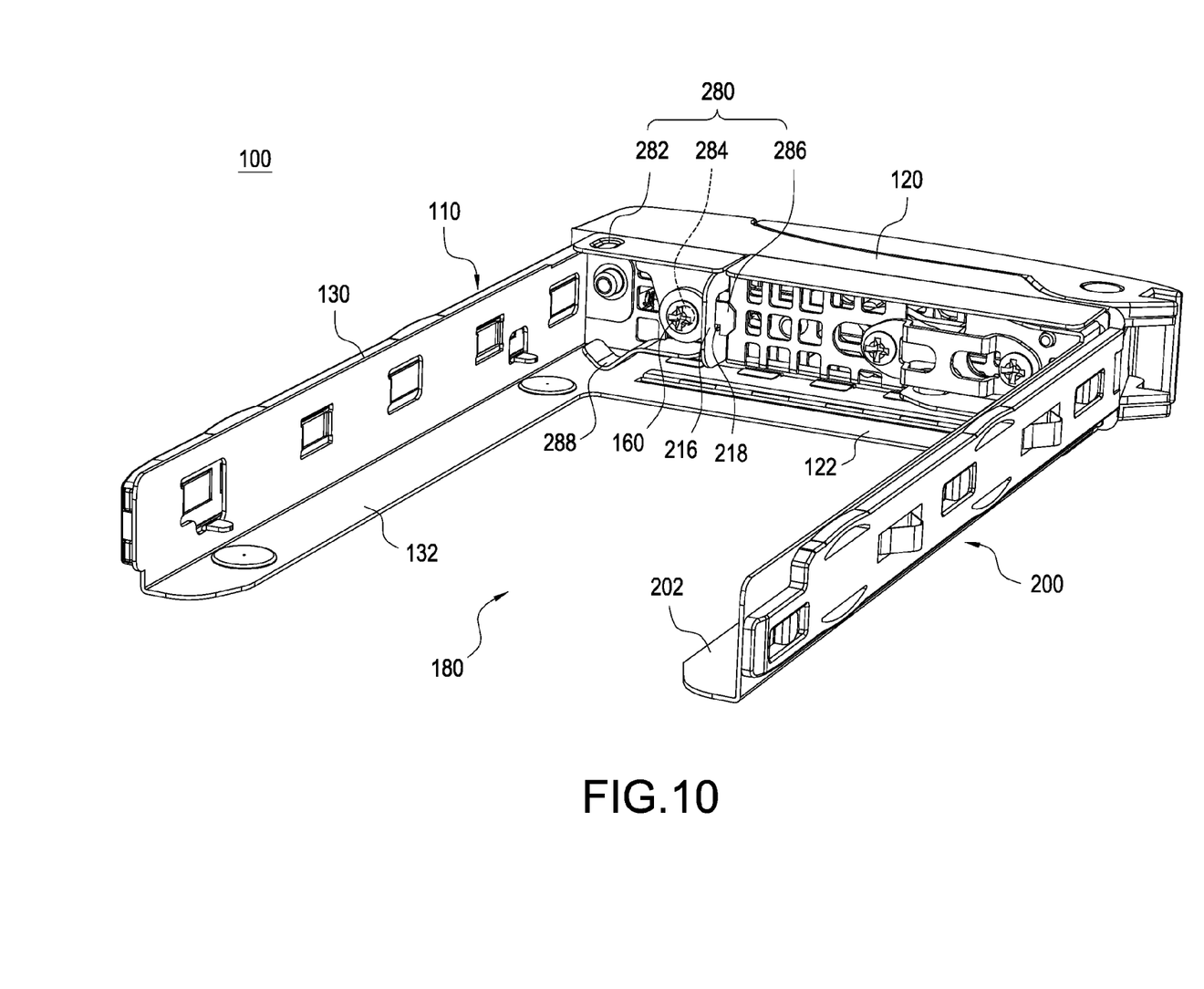
FIG. 10 is a 3-dimensional view showing the fastening member that restricts the displacement of the second supporting arm according to one embodiment of the present invention.
Figure 11:
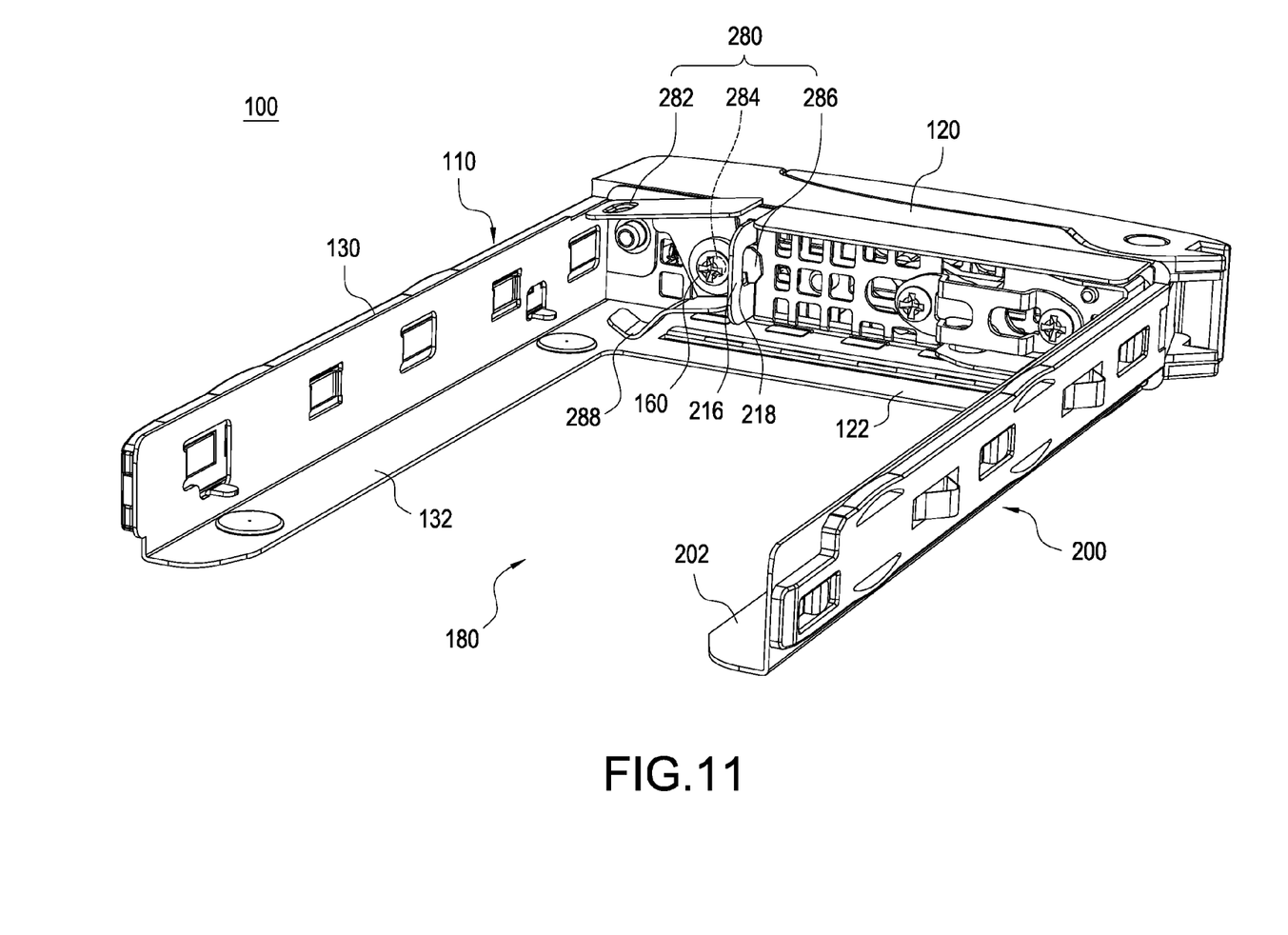
FIG. 11 is another 3-dimensional view showing the fastening member as shown in FIG. 10 that releases the second supporting arm according to one embodiment of the present invention.

As shown in FIGS. 10 and 11, the loading mechanism of a storage device 100 further comprises a fastening member 280 having a pressing part 282, a hinge 284, and a hook 286 to provide further protection mechanism. The hinge 284 is preferably a spindle hole to be fixed to the loading base 120 by the fixing member 160, such as screws and gaskets, to form the rotating axis or axle of the fastening member 280. The fastening member 280 is disposed on the loading base 120 near the stopper plate 216. The pressing part 282 and the hook 286 are provided on two sides of the hinge 284, respectively. The stopper plate 216 is further provided with a buckling hole 218 to allow the hook 286 to extend through the buckling hole 218 to engage with the stopper plate 216. Therefore, when the operator presses the pressing part 282, the fastening member 280 uses fixing member 160 as an axle to bring the hook 286 to rotate and to disengage with the stopper plate 216, and the second supporting arm 200 can laterally slide away and detach from the loading base 120. On the contrary, when the second supporting arm 200 is pushed back to install the hard drive (not shown), the hook 286 directly extend through the bucking hole 218 to engage with the stopper plate 216, and then to finish the positioning process.

It is appreciated that the fastening member 280 may further comprise an elastic or resilient member 288. One end of the resilient member 288 extends and connects the fastening member 280, and the other end of the resilient member 288 is abutting against the carrier board 132 to provide elastic force for the pressing part 282.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A loading mechanism of storage device used for accommodating a hard drive, comprising:
   a loading body, including a loading base, a first supporting arm extending from one end of the loading base, and an assembling part provided on the loading base; and
   a second supporting arm laterally and slidably connected to another end of the loading base, and disposed correspondingly to the first supporting arm; one end of the second supporting arm including a stand disposed on the loading base and a sliding member disposed on the stand; the sliding member having an elastic engaging part being able to detachably connect to the assembling part.

2. The loading mechanism of storage device according to claim 1, wherein the sliding member further includes a slider, a restricting part, and a plurality of positioning posts disposed on a side surface of the slider, the restricting part and the elastic engaging part are disposed at two ends of the slider, respectively, the stand includes a plurality of positioning holes and a pair of through holes, each of the plurality of positioning posts is accommodated in each of the plurality of positioning holes to position the sliding member onto the stand, and the pair of the through holes are respectively disposed correspondingly to the restricting part and the elastic engaging part.

3. The loading mechanism of storage device according to claim 2, wherein the assembling part further includes a pair of assembling pillars protruded from a direction of a carrier board of the loading base, each of the assembling pillars penetrates through the restricting part of the sliding member and the elastic engaging part, and each of the through holes, the restricting part is operative to restrict an amount of the displacement of the corresponding assembling pillar.

4. The loading mechanism of storage device according to claim 3, wherein the sliding member further includes an elastic hooking part disposed corresponding to the elastic engaging part and a gap provided between the elastic engaging part and the elastic hooking part, the corresponding assembling pillar is inserted through the gap, and the elastic engaging part and the elastic hooking part are against a cylindrical surface of the assembling pillar.

5. The loading mechanism of storage device according to claim 4, wherein the elastic engaging part further includes a protruding point, openings of the restricting part and the corresponding through hole are both formed as elliptical shape.

6. The loading mechanism of storage device according to claim 2 further comprising an assembling plate provided with a pair of assembling holes and a pair of fixing members, an area of the assembling plate being larger than an area of the pair of the through holes and the assembling plate pushing the stand against the loading base, wherein each of the fixing members extends through each of the pair of assembling holes and each of the pair of assembling pillar, respectively, to restricts a relative movement of the second supporting arm and the loading base.

7. The loading mechanism of storage device according to claim 1, wherein the stand further includes a stopper plate vertically protruded away from the sliding member therefrom, and the stopper plate is disposed on a top of a carrier board of the loading base.

8. The loading mechanism of storage device according to claim 7 further comprising a fastening member having a pressing part, a hinge, and a hook, the fastening member being disposed on the loading base near the stopper plate, the pressing part and the hook being provided on two sides of the hinge, respectively, and the stopper plate further being provided with a buckling hole for engaging with the hook.

9. The loading mechanism of storage device according to claim 1, wherein edges of the loading base, the first supporting arm, and the second supporting arm are respectively connected to a carrier board, a height of the carrier board of the second supporting arm is higher than a height of the carrier board of the loading base, the carrier boards of the loading base and the first supporting arm are connected to each other, the first supporting arm further includes a pair of protruding parts and a pair of pads, each of the protruding parts protrudes toward the second supporting arm in parallel with the carrier board, each of the pair of pads is disposed on the carrier board.

10. The loading mechanism of storage device according to claim 1, wherein the second supporting arm further includes a pair of protruding parts, the carrier board includes a reinforcing rib parallel to the second supporting arm.

11. The loading mechanism of storage device according to claim 1 further comprising a handle having a pivot and a pushing part, the pushing part being provided on one end of the handle, and the handle rotatably connected to the loading base with the pivot as a rotation axis.

* * * * *